United States Patent [19]

Kim

[11] Patent Number: 5,233,489

[45] Date of Patent: Aug. 3, 1993

[54] FAST SCREEN DETECTING DEVICE OF VTR

[75] Inventor: Boon-Joo Kim, Suwon, Rep. of Korea

[73] Assignee: SamSung Electronics Co., Ltd., Suwon, Rep. of Korea

[21] Appl. No.: 714,979

[22] Filed: Jun. 14, 1991

Related U.S. Application Data

[63] Continuation of Ser. No. 374,978, Jul. 3, 1989, abandoned.

[30] Foreign Application Priority Data

Jul. 4, 1988 [KR] Rep. of Korea .............. 10901/1988

[51] Int. Cl.$^5$ .................. G11B 15/665; G11B 15/61
[52] U.S. Cl. .......................................... 360/85; 360/95
[58] Field of Search ............................. 360/84, 85, 95

[56] References Cited

U.S. PATENT DOCUMENTS

| 4,695,906 | 9/1987 | Kim | 360/95 |
|---|---|---|---|
| 4,704,644 | 11/1987 | Takenouchi | 360/85 |
| 4,745,498 | 5/1988 | Maeda et al. | 360/85 |
| 4,907,110 | 3/1990 | Ando | 360/85 |
| 4,951,163 | 8/1990 | Nakamichi | 360/85 |
| 4,972,278 | 11/1990 | Hara et al. | 360/94 |
| 5,025,331 | 6/1991 | Hirayama et al. | 360/85 |

Primary Examiner—Stuart S. Levy
Assistant Examiner—Craig A. Renner
Attorney, Agent, or Firm—Robert E. Bushnell

[57] ABSTRACT

A video tape recorder having a fast screen detecting device which includes a pinch lever which is driven by a master cam, and a control device comprising a brake lever for driving main brakes. The brake lever has a cam part in contact with the bent part of the pinch lever so that the brake lever is also driven by the master cam. Further, a guide post, driven by the master cam, partially loads video tape to enable control signal detection by a control head; the video tape in the partially loaded condition is not in contact with the head drum so that excessive tape wear is avoided.

25 Claims, 2 Drawing Sheets

FAST SCREEN DETECTING DEVICE OF VTR

This is a continuation of U.S. application Ser. No. 07/374,978 filed on Jul. 3, 1989, now abandoned.

BACKGROUND OF THE INVENTION

This invention relates to a fast screen detecting device for searching quickly the contents of a recording on a cassette tape.

The conventional screen detecting device of a video tape recorder (VTR) uses a control signal detector when advancing or rewinding the video tape at a speed corresponding to a fastforward (FF) or rewind (REW) mode, instead of the normal speed of the play mode, or uses a separate head. Consequently, friction due to the high speed occurs between the head drum and the video tape thereby damaging the video tape. Further, the reliability of the running parts is also undermined. These problems, however, are avoided by the instant invention.

SUMMARY OF THE INVENTION

The present invention was made in consideration of the above-identified problems. An object of the present invention is to prevent a rise in cost by installing a fast screen detecting device which only partially loads the video tape on a driving part and a control device which operates simply and does not use a separate head. Another object of the present invention is to provide a fast screen detecting device in which damage to the video tape is prevented by providing separation between the head drum and the video tape when searching for selected screens.

According to the present invention, there is provided a screen detecting device for a VTR having a pinch lever of a pinch roller driving part which is driven by a master cam, the master cam rotating bi-directionally. The screen detecting device includes a control device which has a brake lever for driving a main brake installed on a slide plate. The brake lever incorporates a cam part in contact with the bent part of the pinch lever. The screen detecting device also includes a detection and loading device comprising a guide post for guiding a half loaded video. The guide post is driven by the detecting cam via the pinch lever.

BRIEF DESCRIPTION OF THE INVENTION

DETAILED DESCRIPTION OF THE INVENTION

The present invention will now be described in more detail with reference to the accompanying drawings.

Figure 1:
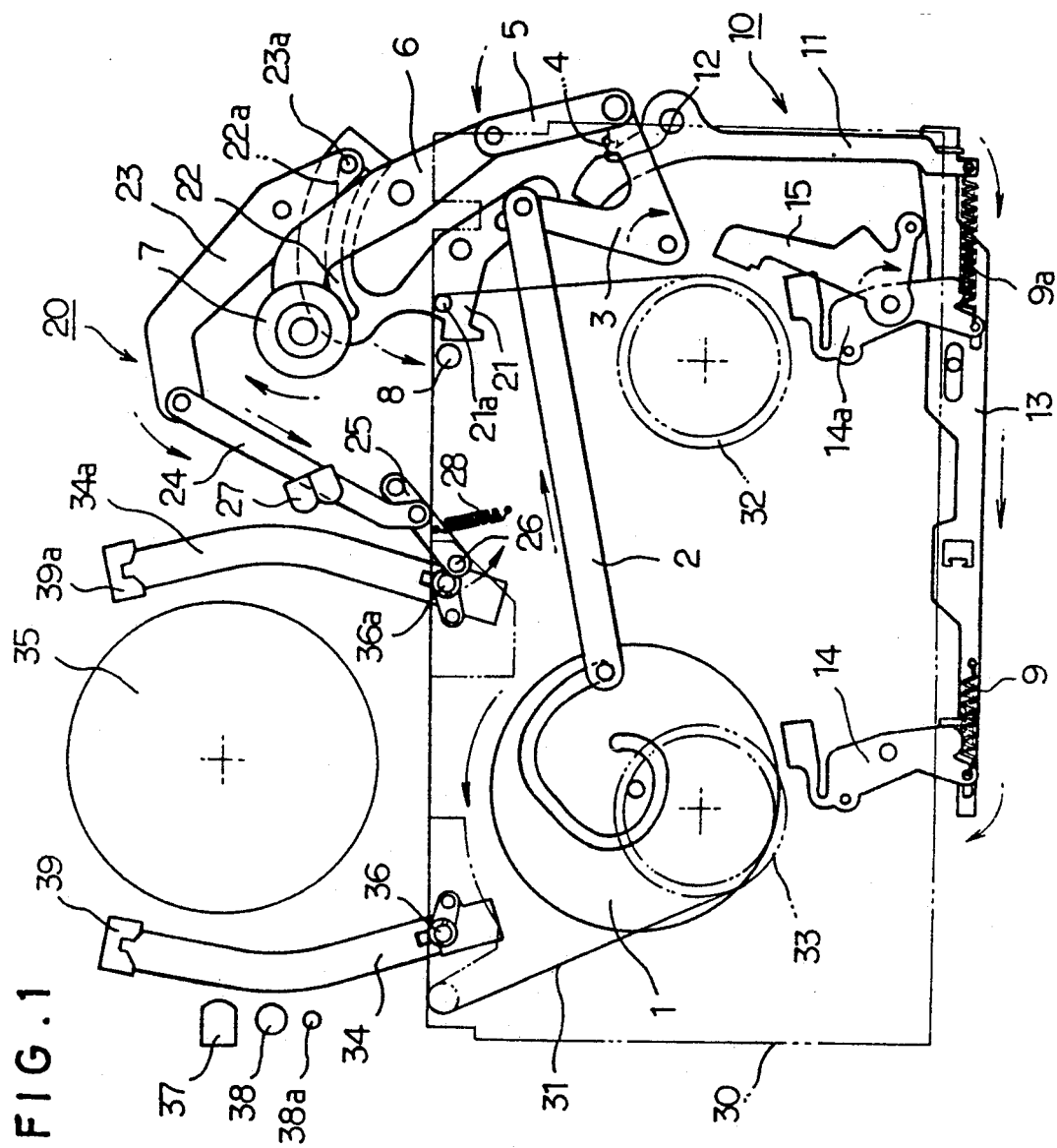
FIG. 1 is a plan view of the installation diagram according to the present invention.
Figure 2:
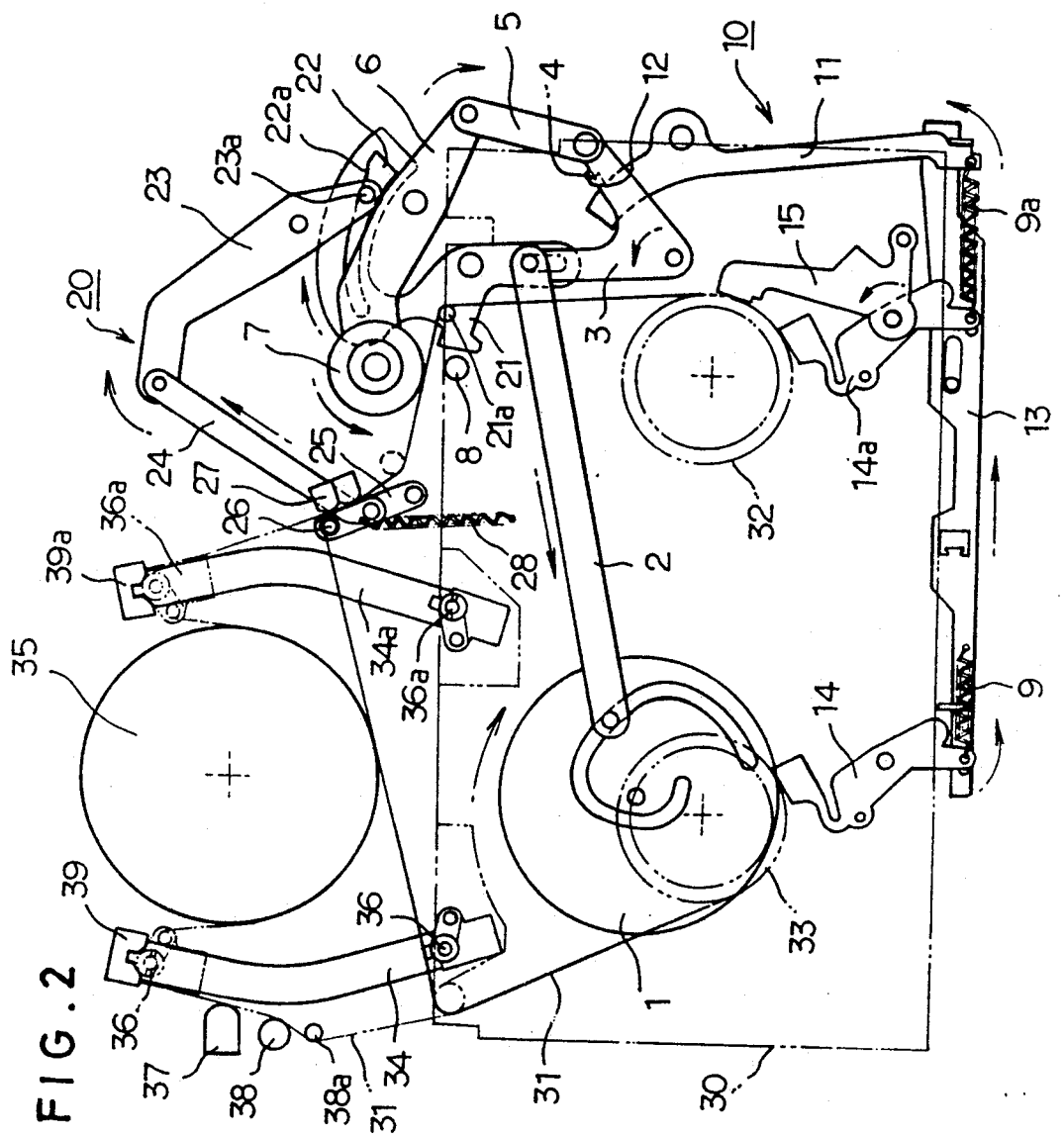
FIG. 2 is a plan view of the operation diagram according to the present invention.

FIG. 1 and FIG. 2 are embodiments of the present invention in which a formed cam part 12 of the brake lever 11 of the control device 10 is in contact with a bent part 4 on a bottom side of a pinch lever 3. The pinch lever 3 is connected to a master cam 1 via a link lever 2. The pinch lever is also connected to a pinch link 5. A lower portion of the brake lever 11 is connected to the slide plate 13 so that main brakes 14 and 14a engaging the slide plate 13 can be driven against a supply reel table 33 and a take-up reel table 32. Springs 9 and 9a bias the main brakes 14 and 14a. A soft brake 15 for braking the take-up reel table 32 is driven by a different brake driving device which is not shown in the figures. A pinch roller 7 compresses the video tape against a capstan shaft 8 in response to the pinch lever 3 driving pinch arm 6 via the pinch link 5. The pinch lever 3 is pivoted in response to a cam curve of the master cam 1 by the link lever 2. The master cam can be rotated bi-directionally by a loading motor, not shown.

A detection and loading device 20 includes a detecting cam 21 having a tension pin 21a. The detecting cam 21 is connected to a top of the pinch lever 3 and to the lever link 2. The detecting cam incorporates a section groove 22 with an incline 22a. A link arm 23 pivotally attached to a housing has a guide pin 23a which rides in the section groove. The link arm 23 is pivotally connected to a detecting link 24. The detecting link connects to a guide post 25. The guide post 25 is elastically biased by a spring 28 and has a guide post pin 26. The guide post 25 is rotated in response to the rotation of the master cam 1 so that the video tape is brought into close proximity to an audio/control (A/C) head 27 to thereby enable detection of audio and control signals which are recorded on the video tape 31.

A drum loading device includes loading arms 36 and 36a which wrap the video tape around the head drum 35. The loading arms 36 and 36a travel along running paths 34 and 34a, respectively, to be positioned against stoppers 39 and 39a during a play mode. A full erase (F/E) head 37, an impedance roller 38, and a tension pole 38 are also provided.

The present invention, configured as described above, can search for a desired screen without damage to the video tape 31 when the detection and loading device 20 is operated by the loading motor to partially load the video tape when the tape case 30 is inserted into the video tape recorder. FIG. 2. illustrates the state of the video tape recorder when the video tape 31 is in the partially loaded state. The tape is placed in the partially loaded state by the clockwise rotation of the master cam 1. This rotation moves the lever link 2 to the left according to the cam curve formed in the master cam 1. Consequently, the pinch lever 3 is rotated counterclockwise, the pinch link 5 is moved upward, and the pinch arm 6 is rotated counterclockwise moving the pinch roller 7 toward the capstan shaft 8.

Also at this time, the bent part 4 of the pinch lever 3, which is rotated counterclockwise, contacts the cam part 12 of the brake lever 11 of the control means 10. The brake lever is pivoted counterclockwise and the slide plate 13 slides to the right so that the main brakes 14 and 14a can be elastically controlled by the springs 9 and 9a. The soft brake is controlled by the different driving mechanism.

Also at this time, the detecting cam 21 of the detection and loading device 20, which is connected to the pinch lever 3 and the lever link 2, is rotated clockwise by the rotating pinch lever 3. The rotation of the detecting cam makes the guide pin 23a inserted in the section groove 22 contact with incline 22a of the section groove. Consequently, the link arm 23 is rotated clockwise, the detecting link 24 connected to the link arm 23 is moved upward, and the guide post 25 is rotated clockwise. From this action, the video tape is placed in the partially loaded state in which the video tape is in contact with the A/C head 27 but not in contact with the head drum 35. The video tape is not dangling but is held under tension by the tension pin 21a formed on the detecting cam 21.

After the end of the operation, if a key, not shown in figures, is selected by a user and the video tape 31 is fast forwarded, the tape passes by the A/C head 27 but the problems caused by friction are removed since the video tape 31 is not in contact with the head drum 35.

When a specified code indicative of the desired screen is detected by the A/C head 27 in the control signal recording part of the video tape 31, the video tape is brought into contact with the head drum 35 by moving the loading arms 36 and 36a to the stoppers 39 and 39a along the loading paths 34 and 34a enabling a play mode. Thus, the desired screen can be searched. In contrast, if screen detection is not desired by the user, from the partially loaded position, the video tape can be fully loaded to enable a normal mode of operation as in a conventional VTR.

As mentioned above, the present invention detects the contents of a recorded video tape. The invention is inexpensive to produce since the control device and the detection and loading device are driven by same device which drives the pinch roller. Further, the invention avoids tape wear and improves the reliability of the moving parts because, although the video tape is transported quickly during the screen detection operation, the video tape is not in contact with the head drum but is positioned so that the A/C head can detect the control signals recorded on the video tape.

The invention is in no way limited to the embodiments hereinabove. Various modifications of disclosed embodiments as well as other embodiments of the invention will become apparent to persons skilled in the art upon reference to the description of the invention. It is therefore contemplated that the appended claims will cover any such modifications or embodiments as fall within the true scope of the invention.

I claim:

1. A fast screen detecting device for a video tape recorder having a pinch lever of a pinch roller driving part driven by a master cam providing bidirectional rotation, the device comprising:
   control means including a brake lever for driving main brakes via a slide plate, said brake lever having a cam part in contact with a bent part of said pinch lever, and
   detection loading means having a guide post for guiding a partially loaded tape, said detection loading means having a detecting cam connected to said pinch lever, wherein pivotal displacement of the pinch lever by said master cam drives said pinch roller driving part for a pinch roller and drives said guide post to reposition the tape so as to engage the pinch roller and the guide post to effect the partial loading of the tape, said pivotal displacement of said pinch lever moving said brake lever for driving said main brakes.

2. A fast screen detecting device according to claim 1, wherein said detection loading means further comprises:
   a detecting link for pivotally engaging said guide post; and
   a link arm, connected to said detecting link, including a guide pin for engaging the detecting cam.

3. The fast screen detecting device according to claim 1, wherein said detection loading means further comprises a link arm having a first end pivotally attached to a first end of a detecting link, said link arm engaging a cam portion of said detecting cam via a guide pin secured to a second end of the link arm, the guide post being attached to a second end of said detecting link.

4. A fast screen detecting device, comprising:
   control means having a brake lever, said brake lever having a camming element, pivotally engaging a pinch lever connected to a pinch roller, said pinch lever having a bent part for engaging said camming element of said brake lever, for driving main brakes against reel tables of corresponding reels of a cassette bearing a tape in response to displacement of the pinch roller to engage the tape; and
   detection loading means having a guide post, for pivotally engaging the pinch lever and for responding to the presence of the tape by moving the tape to engage the pinch roller as the pinch lever pivots the pinch roller towards the tape.

5. A fast screen detecting device for a video tape recorder having a pinch lever of a pinch roller driving assembly driven by a master cam providing bidirectional rotation, the device comprising:
   control means including a brake lever for driving main brakes mounted on a slide plate, said brake lever comprising a formed cam part in contact with a bent part of said pinch lever; and
   detection loading means comprising:
      a guide post for partially loading a tape;
      a detecting cam connected with said pinch lever and a link lever, said link lever being further connected to said master cam so as to drive said detecting cam and said pinch lever in response to rotation of said master cam; and
      a linking portion connected between said detecting cam and said guide post;
   wherein said link lever is driven by said master cam to pivotally displace said pinch lever thereby effecting rotation, via said linking portion, of said guide post to reposition the tape, and further effecting rotation of said brake lever for driving said main brakes.

6. A fast screen detecting device according to claim 5, wherein said pinch roller driving assembly comprises:
   a pinch link connected to said pinch lever; and
   a pinch arm connected to said pinch link and further connected to a pinch roller, wherein said pivotal displacement of said pinch lever moves said pinch roller in order to engage said tape.

7. A fast screen detecting device according to claim 5, wherein said control means further includes a soft brake, and wherein said pivotal displacement of said pinch lever controls said brake lever for driving said main brakes and said soft brake.

8. A fast screen detecting device according to claim 5 further comprising:
   an A/C head, wherein said guide post repositions said tape to contact said A/C head.

9. A fast screen detecting device according to claim 5, wherein said linking portion comprises:
   a pin pivotally connecting said guide post to a detecting link; and
   a link arm including a guide pin for engaging the detecting cam, wherein said link arm is further connected to said detecting link.

10. A fast screen detecting device according to claim 9, wherein said detecting cam includes a section groove; and
   said section groove includes an inclined part, wherein said guide pin is in contact with said inclined part prior to said pinch lever being pivotally displaced.

11. A fast screen detecting device according to claim 9, wherein said pinch roller driving assembly comprises:
   a pinch link connected to said pinch lever; and
   a pinch arm connected to said pinch link and further connected to a pinch roller, wherein said pivotal displacement of said pinch lever moves said pinch roller in order to engage said tape.

12. A fast screen detecting device according to claim 9, wherein said control means further includes a soft brake, and wherein said pivotal displacement of said pinch lever controls said brake lever for driving said main brakes and said soft brake.

13. A fast screen detecting device according to claim 9, further comprising:
   an A/C head, wherein said guide post repositions said tape to contact said A/C head.

14. A fast screen detecting device for a video tape recorder, the device comprising:
   a master cam providing bi-directional rotation;
   a pinch lever being driven by said master cam via a link lever, said pinch lever for driving a pinch roller;
   control means including a brake lever for driving main brakes via a slide plate, said brake lever having a cam part in contact with a bent part of said pinch lever to be driven by said pinch lever; and
   detection and loading means including a guide post for only part loading video tape and being driven by said master cam via said link lever.

15. A video tape recording device having a screen searching function, said device comprising:
   a housing;
   a master cam having a cam curve;
   a head drum, rotatably attached to said housing, comprising video heads for detecting video signals recorded on a video tape of a video tape cassette;
   control means for controlling braking of a supply reel of said video tape cassette, said control means comprising a brake lever, a slide plate driven by said brake lever, and a first main brake engaging said slide plate for braking said supply reel;
   a pinch lever linked to said master cam via a link lever to be driven in response to said cam curve by rotating said master cam, said pinch lever for driving said brake lever and a pinch roller;
   detection means, comprising a control head, a guide post for guiding said video tape in proximity to said control head so that said control head can detect control signals recorded on said video tape, and a guide post linkage linked to said master cam via said link level for positioning said guide post in response to rotation of said master cam, said detection means for searching for selected screens recorded on said video tape in response to said control signals;
   a playback/record video tape path wherein said video tape is held in proximity with said head drum; and
   a search video tape path wherein said video tape is at least partially separated from said head drum and held in proximity with said control head by said guide post to allow detection of said control signals.

16. A video tape recording device as claimed in claim 15, wherein said control means further comprises a second main brake, driven by said slide plate, for braking a take-up reel, wherein said first main brake and said second main brake are pivotally attached to said housing and connected to said slide plate via coupling pins.

17. A video tape recording device as claimed in claim 15, wherein said brake lever is pivotally attached to said housing and comprises a cam part, and said pinch lever comprises a bent part for engaging said cam part.

18. A video tape recording device as claimed in claim 17, wherein said guide post linkage comprises:
   a detecting cam, connected to and pivoted by said link lever, comprising a section groove;
   a link arm comprising a guide pin for riding in said section groove; and
   a detecting link pivotally connected to said link arm, carrying said guide post.

19. A video tape recording device as claimed in claim 18, wherein said detecting cam and said link arm are pivotally attached to said housing.

20. A video tape recording device as claimed in claim 17, further comprising
   a capstan shaft for transporting said video tape, said pinch roller for urging said video tape against said capstan shaft; and
   pinch roller linkage, driven by said pinch lever, for carrying and positioning said pinch roller.

21. A video tape recording device as claimed in claim 20, wherein said pinch lever is "V" shaped, pivotally attached to said housing at a vertex, connected to said link lever and said guide post linkage at a first distal end, and connected to said pinch roller linkage at a second distal end.

22. A video tape recording device as claimed in claim 15, further comprising:
   a capstan shaft for transporting said video tape, said pinch roller for urging said video tape against said capstan shaft; and
   pinch roller linkage, driven by said pinch lever, for carrying and positioning said pinch roller.

23. A video tape recording device as claimed in claim 22, wherein said pinch roller linkage comprises:
   a pinch link pivotally connected to said pinch lever;
   pinch arm having said pinch roller rotatably disposed at a first end, pivotally connected to said housing at a center portion, and connected to said pinch link at a second end.

24. A method for transporting video tape in a video tape recording device comprising a screen detecting function, said video tape recording device comprising: a housing; a head drum rotatably attached to said housing and comprising video heads for detecting video signals; a pinch lever of a pinch roller driving part driven by a master cam providing bi-directional rotation; control means for controlling braking of a supply reel of a video tape cassette and including a brake lever for driving main brakes via a slide plate, said brake lever having a cam part in contact with a bent part of said pinch lever; and detection means for searching for selected screens recorded on said video tape in response to control signals recorded on said video tape and comprising a guide post for guiding said video tape, a detecting cam for positioning said guide post in response to movement of said pinch lever and a control head for detecting said control signals, wherein pivotal displacement of said pinch lever by said master cam moves said pinch roller and said guide post to engage said tape so as to position said tape in a search video tape path, said pivotal displacement of said pinch lever moving said brake lever for driving said main brakes, said method comprising:

transporting said video tape along a playback/record video tape path in which said video tape is held in proximity with said head drum, during video signal regeneration; and transporting said video tape along said search video tape path in which said video tape is at least partially separated from said head drum and held in proximity with said control head to allow detection of said control signals, during program searching.

25. A method for transporting video tape as claimed in claim 24, wherein said video tape is automatically placed in said search video tape path upon loading of a video tape cassette.

* * * * *

UNITED STATES PATENT AND TRADEMARK OFFICE
CERTIFICATE OF CORRECTION

PATENT NO. : 5,233,489
DATED : 3 August 1993
INVENTOR(S) : Boon-Joo Kim It is certified that error appears in the above-identified patent and that said Letters Patent is hereby corrected as shown below:

Column 5,

Line 52, change "level" to --lever--;

Signed and Sealed this

Thirtieth Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,233,489
DATED : August 3, 1993
INVENTOR(S) : Bong Joo KIM

It is certified that error appears in the above-indentified patent and that said Letters Patent is hereby corrected as shown below:

TITLE PAGE

Bracket [75] Inventor:: change "Boon-Joo Kim" to --Bong-Joo Kim--.

Signed and Sealed this

Thirtieth Day of May, 1995

Attest:

BRUCE LEHMAN

*Attesting Officer*   *Commissioner of Patents and Trademarks*